Dec. 1, 1953  T. R. NEUTELINGS ET AL  2,660,961
BAKING OVEN
Filed Jan. 24, 1949
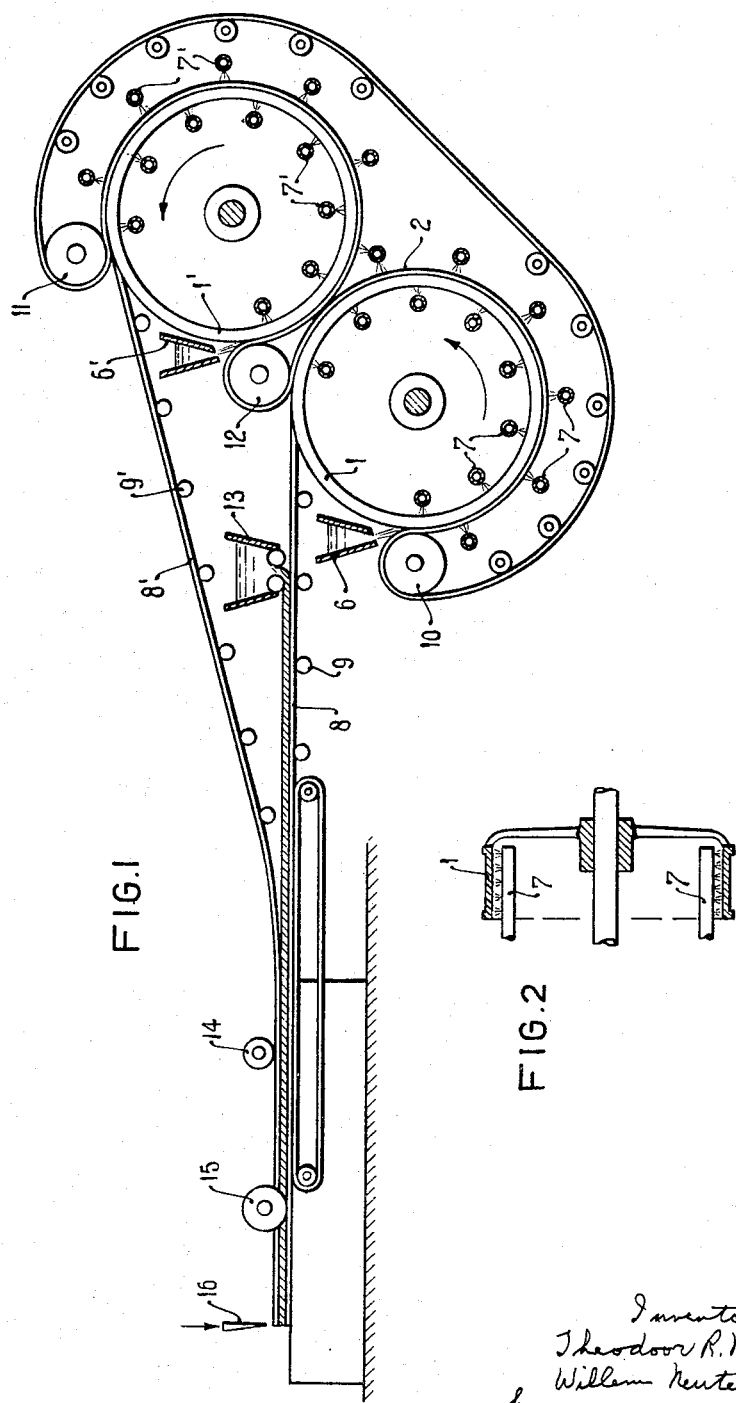

Patented Dec. 1, 1953

2,660,961

UNITED STATES PATENT OFFICE 2,660,961

BAKING OVEN

Theodoor R. Neutelings and Willem Neutelings, Bergen op Zoom, Netherlands, assignors to Industrie- en Handelmaatschappij "De Vuurslag" C. V. Roosendaal, Netherlands, a company of the Netherlands Application January 24, 1949, Serial No. 72,442

Claims priority, application Netherlands January 26, 1948

2 Claims. (Cl. 107—1)

This invention relates to an oven for baking wafer sandwiches in the form of a continuous sheet.

The invention has for its object to provide an oven of this kind which is of a compact construction. To this end according to the invention the oven comprises two hollow rotating drums arranged in spaced relation and at different levels, a continuously moving endless band enveloping a portion of the outer circumferential surface of each drum, heating means disposed in each of said drums and means for feeding dough to the juncture between each drum and the band, where said latter runs on the drum. On the sheet of wafers obtained on the lower drum a coating substance such as cream, jam, ice cream and the like may be applied and subsequently the upper sheet of wafers supplied by the upper drum is fed to the coated lower sheet of wafers and the sandwich sheet thus obtained is thereafter cut into wafers of the desired size by means of cutting elements such as rotary cutting discs, rectilinearly moving knives or cutting wires. In order to obtain circular or sector-shaped wafers they may be punched from the band.

The invention will be further described with reference to the accompanying drawing in which an embodiment of the oven according to the invention is illustrated.

Figure 1 shows a diagrammatic side view of an oven according to the invention.

Figure 2 is an axial section of a drum of the oven shown in Figure 1.

The oven shown in Figure 1 comprises two rotary drums 1, 1' around which a common metal band 2 is passed running on terminal rollers 10, 11 and on an intermediate roller 12. The band 2 leaves a space with respect to the drum surface corresponding to the thickness of the sheet forming the wafers. The drums 1 and 1' are rotated in the direction of the arrow preferably by the terminal roller 11 so as to tighten the band 2 on the drums. The drums are heated internally e. g. by means of gas burners 7 and 7' respectively whereas burners 7 and 7' are also arranged at the enveloping laps of the band outside the drums. The batter of dough is fed to the drum 1 from the receptacle 6 and to the drum 1' from the receptacle 6' and flows into the space formed between the enveloping laps of the band and the drum surface so as to obtain two sheets 8, 8' of wafers moving with equal velocities. The surfaces of the drums 1, 1' and of that of the band 2 facing the drum surface may be provided with depressions in order to obtain embossed representations on the sheet of wafers. The sheet 8 leaves the drum 1 at the intermediate roller 12 in order to be further conveyed on a roller track 9 and the sheet 8' leaves the drum 1' at the terminal roller 11 and is conveyed on a roller track 9'. Above the lower sheet 8 a filling device 13 is arranged which supplies a coating to the sheet. The upper sheet 8' is pressed into the coating on the lower sheet 8 by means of a roller 14 of soft material.

Thereafter the sandwich sheet thus obtained is fed to a number of cutting discs 15 or wire-shaped cutting elements extending in longitudinal direction of the sheet and said cutting elements are followed by a knife 16 or like cutting element for making transverse cuts. The cutting element 16 should during the cutting operation also move in the longitudinal direction of the band and with the same speed as said latter in order to obtain straight cuts.

What we claim is:

1. An oven for baking wafer batter, for making sandwiches, in the form of continuous sheets, comprising two hollow rotating drums arranged in spaced relation and at different levels, a continuously moving endless band enveloping a portion of the outer circumferential surface of each drum, heating means disposed in each of said drums and means for feeding dough to the juncture between each drum and the band where the latter runs onto the drums.

2. An oven for baking wafer batter, for making sandwiches, in the form of continuous sheets, comprising two hollow rotating drums arranged in spaced relation and at different levels, a continuously moving endless band enveloping a portion of the outer circumferential surface of each drum, heating means disposed in each of said drums and heating means disposed outside the drums at each enveloping lap of the endless band and means disposed at the juncture between each drum and the band for feeding dough between the drums and the band where the latter runs onto the drums.

THEODOOR R. NEUTELINGS.
WILLEM NEUTELINGS.

References Cited in the file of this patent

UNITED STATES PATENTS

| Number | Name | Date |
|---|---|---|
| 562,962 | Holmes | June 30, 1896 |
| 799,715 | Carroll | Sept. 19, 1905 |
| 1,542,710 | Laskey | June 16, 1925 |
| 1,771,506 | Mustin | July 29, 1930 |
| 2,149,538 | Morton | Mar. 7, 1939 |
| 2,391,937 | Arvidson | Jan. 1, 1946 |

FOREIGN PATENTS

| Number | Country | Date |
|---|---|---|
| 21,816 | Great Britain | Oct. 3, 1906 |
| 255,026 | Great Britain | Mar. 3, 1927 |
| 639,227 | France | Mar. 6, 1928 |